April 21, 1942.  C. W. P. HEYLANDT  2,280,487
COMPOUND EXPANSION INTERNAL COMBUSTION ENGINE
Filed May 22, 1937  3 Sheets-Sheet 1
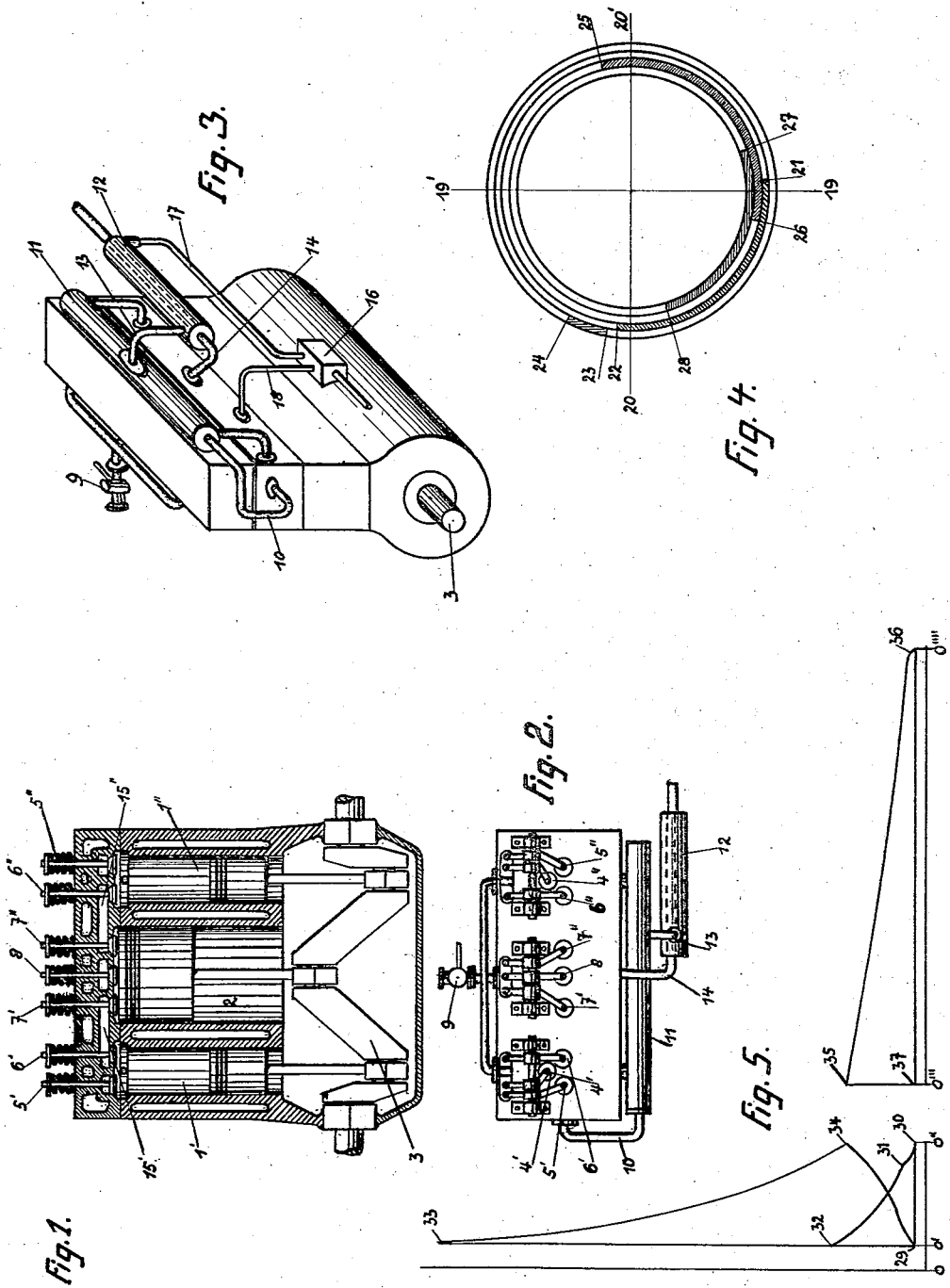
Inventor:
Christian Wilhelm Paul Heylandt

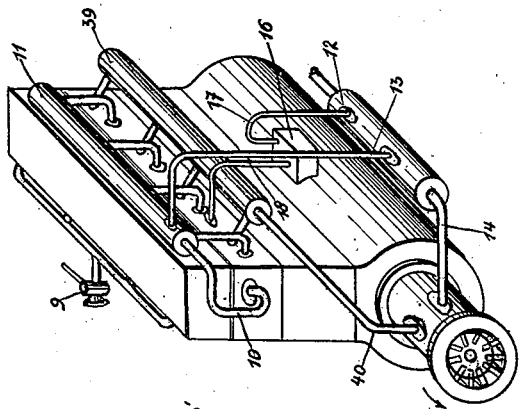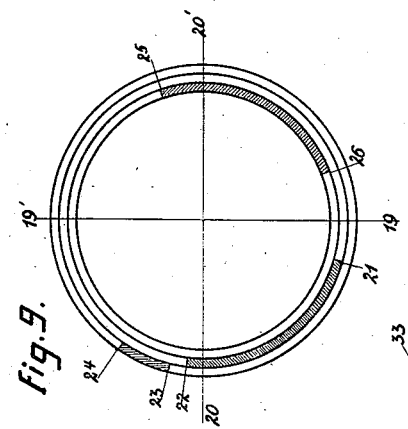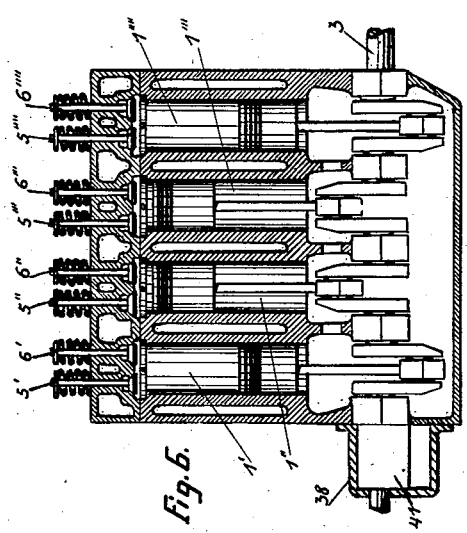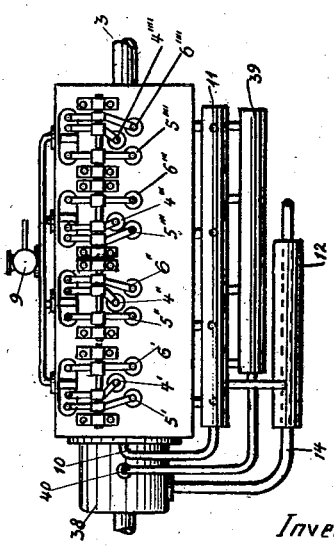

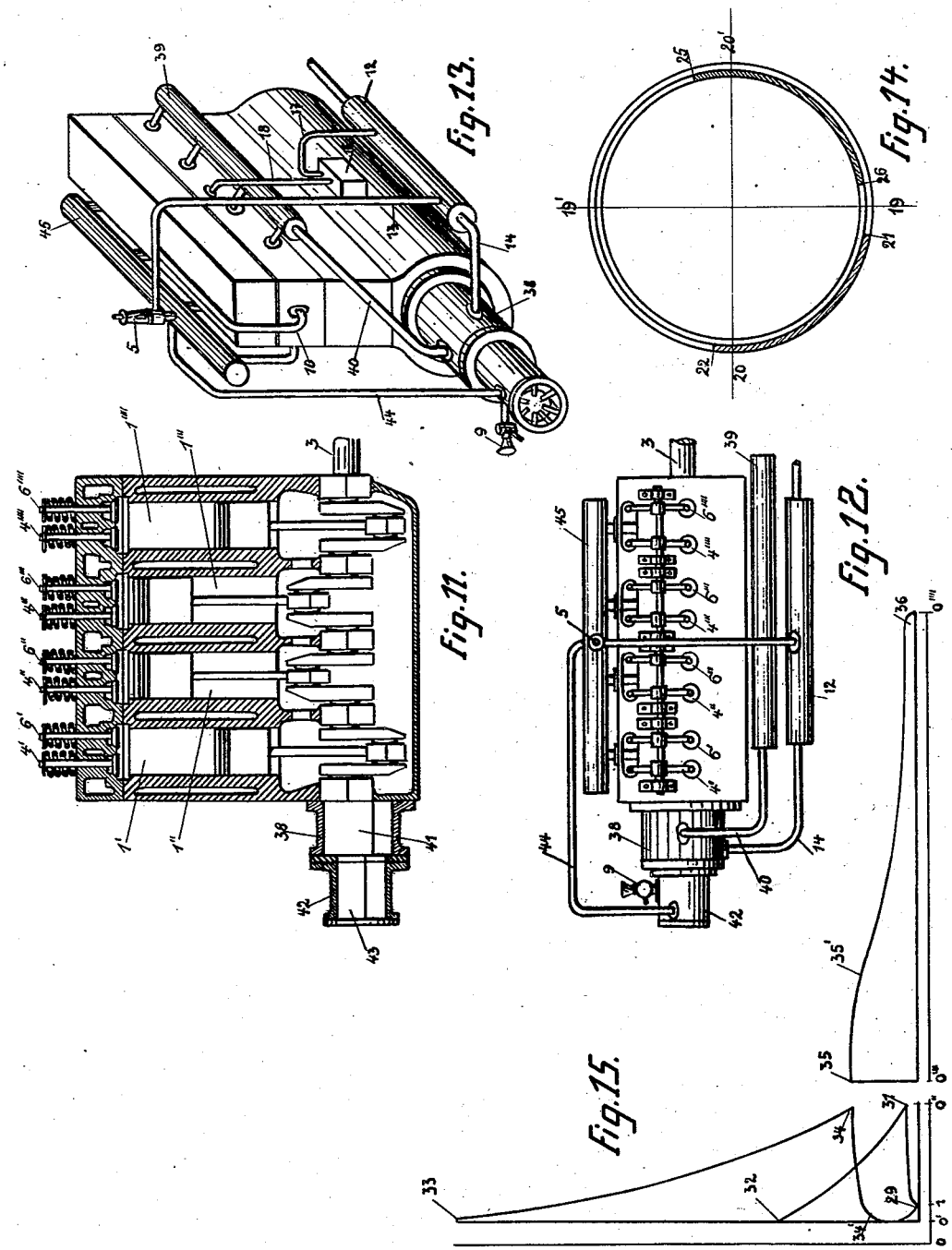

Patented Apr. 21, 1942

2,280,487

UNITED STATES PATENT OFFICE 2,280,487

COMPOUND EXPANSION INTERNAL COMBUSTION ENGINE

Christian Welhelm Paul Heylandt, Berlin-Britz, Germany

Application May 22, 1937, Serial No. 144,149
In Germany May 22, 1936

7 Claims. (Cl. 60—15)

The invention relates to internal combustion engines having several stages and where the cooling of the cylinders of the first stage is effected by the vaporisation of water or of a similar liquid and where the heat of the exhaust gases also serve to vaporize water or a similar liquid and has more in detail the character of the combination of the installations known in themselves and the special method of their operation.

The object of the invention is further the addition of moist, dry or superheated steam to the charge of air in the first stage and combustible without the charge being thereby decreased, while apart therefrom the volume of the working chamber of the second stage is so dimensioned that when expanding the products of combustion and the added steam, the final pressure of the expansion in the second stage is approximately equal to atmospheric pressure.

Furthermore the object of the invention consists therein that when air from the atmosphere is drawn in additional admission of steam takes place at the beginning of the compression stroke of this stage in which case after the working stroke of the first stage is finished the exhaust of the gas from the cylinder of this stage and the expansion in the working chamber of the second stage takes place simultaneously, both chambers being in free connection with each other so that the pressure towards the end of the exhaust of the gas from the first stage and towards the end of the expansion of the second stage is lowered in both chambers to about atmospheric pressure.

A further feature of the invention consists in that when air is drawn into the first stage from the atmosphere and when additional steam is admitted at the beginning of the compression stroke of this stage and after the working stroke of the first stage is finished, the products of combustion and the additionally passed in steam is exhausted at a constant pressure of the height of the final pressure of the working stroke of the first stage into a recipient from where they are then passed to the second stage which is constituted by a rotary engine.

A further object of the invention is that when after the working stroke of the first stage is finished the exhaust from the cylinder of this stage takes place at a constant pressure of the height of the final pressure of the working stroke of the first stage into a recipient from where the products of combustion with the additionally led in steam pass for expansion into the second stage, which preferably consists of a rotary engine, and when a preliminary compression of the charge of the first stage is effected, the additional leading of the steam into the charge takes place after said preliminary compression has been effected.

The invention does however not relate to the construction of the rotary engine.

Thus the invention comprises a new combination and arrangement of apparatus fully described, explained and illustrated on the accompanying drawings of which:

Fig. 1 is a longitudinal section of an internal combustion engine according to the invention having two cylinders of the first stage acting in a four-cycle and with one cylinder of the second stage acting in a two-cycle, the latter cylinder being arranged between the two cylinders of the first stage, the arrangement being known in itself and not forming the object of the present invention;

Fig. 2 is a plan of Fig. 1;

Fig. 3 is a perspective view of the engine;

Fig. 4 is a diagram showing the opening periods of the valves for one revolution of the camshaft whose number of revolutions amounts to half the number of revolutions of the crankshaft relative to the positions of the crank of the first stage;

Fig. 5 is a pressure volume diagram of the first and second stage of this engine;

Fig. 6 is the longitudinal section of a second mode of construction of an internal combustion engine having four cylinders of the first stage acting in a four-cycle and a second stage represented by a rotary engine.

Fig. 7 is a plan of Fig. 6;

Fig. 8 is a perspective view thereof;

Fig. 9 is a diagram showing the opening periods of the valves during one revolution of the camshaft relative to the positions of the crank of the first stage in which case the camshaft has half the number of revolutions of the crankshaft;

Fig. 10 is a pressure volume diagram of the first and second stage of this engine;

Fig. 11 is a longitudinal section of a third mode of construction through the internal combustion engine, having four cylinders of the first stage working in a four-cycle and a second stage constructed as a rotary engine when the first stage is overcharged;

Fig. 12 is a plan of Fig. 11;

Fig. 13 is a perspective view thereof;

Fig. 14 is a diagram showing the opening periods of the valves during one revolution of the camshaft making half the number of revolutions of the crankshaft and relative to the positions of the cranks of the first stage;

Fig. 15 is a pressure volume diagram of the same engine.

In Fig. 1 two cylinders 1' and 1'' of the first stage in which combustion takes place, and a cylinder 2 of the second stage have pistons connected to a crankshaft 3 of which the cranks are so thrown that the piston of the second stage namely the low-pressure-piston is at the upper dead point when the pistons of the first stage, namely the high-pressure-pistons, are at the lower dead point. Furthermore the succession of the strokes in both cylinders of the first stage is of such a kind that simultaneously with the suction stroke of the piston in the cylinder 1' the piston in the cylinder 1'' makes the working stroke.

From the plan in Fig. 2 the arrangement of the valves may be seen. 4' and 4'' denote the suction valves and 5' and 5'' the steam-inlet-valves. 6' and 6'' are the transfer valves which cut-off the cylinders of the first stage and 7' and 7'' are the transfer valves which cut-off the cylinders of the second stage from the transfer conduits 15' and 15'' respectively. The outlet valve of the second stage is denoted by 8. During the suction stroke of the cylinder 1' of the first stage air is drawn in by the carburetor 9. After the suction stroke has been completed, thus after the valve 4' has been closed, valve 5' opens and additionally to the charge steam is filled into the cylinder 1'. This steam is taken from a recipient 11 into which by means of the conduit 10 the steam obtained in consequence of the cooling of the cylinders in the cooling jacket and the steam obtained when heating by means of the exhaust gases within the evaporator 12 is passed. The steam introduced at the beginning of the compression stroke into the cylinder 1' is then compressed together with the other part of the charge and shortly before the upper dead point of the piston is reached, ignition takes place by means of the sparking plug. After combustion has taken place upon the downward stroke of the piston in the cylinder 1' the products of combustion and the added steam are expanded in which case towards the end of this stroke the pressure amounts to about 6 atmospheres. Shortly before the lower dead point has been reached, thus shortly before the upper dead point of the piston of cylinder 2 is reached, valves 6' and 7' open, and during the following upward stroke of the piston in cylinder 1' the products of combustion and the added steam are passed over to the cylinder 2 of the second stage and are here expanded down to about atmospheric pressure. The exhaust of the cylinder 1' of the first stage and the expansion in cylinder 2 of the second stage therefore take place simultaneously by means of the transfer conduit 15', both chambers being in free communication with each other. During the then following upward stroke of the low-pressure piston the exhaust gases expanded down to atmospheric pressure are passed through the conduit 14 into the atmosphere after heat has been taken from them in the evaporator 12 while at the same time the piston of the cylinder 1' carries out the suction stroke and the piston of the cylinder 1'' the working stroke. During the following stroke thus by means of the transfer conduit 15'' products of combustion and added steam from the cylinder 1'' will be passed into the cylinder 2 for expansion. The water which has to be added in consequence of vaporisation is forced by means of the pump 16 through the conduit 17 into the evaporator 12 and through the conduit 18 into the cooling jacket of the cylinders.

In Fig. 4 the periods of opening of the valves for the cylinder 1'' and for the two strokes of the cylinder 2 belonging thereto are indicated, in which case one revolution of the camshaft, or two revolutions of the crankshaft correspond to the cycle drawn in full. In this diagram the upper dead points of the two high-pressure pistons correspond to points 19 and 19', thus accordingly to the lower dead points of the low-pressure piston, and the points 20 and 20' to the lower dead points of the high-pressure piston thus accordingly to the upper dead points of the low-pressure piston. Shortly before the point 19 is reached, the suction valve 4' opens at the point 21 and closes shortly beyond the point 20 at the point 22. Directly thereafter the steam-intake valve 5' opens at point 23 and closes at point 24. Until the upper dead point 19' is reached, compression of the charge of the combustible and air and of the additionally admitted steam takes place, the latter producing a higher final pressure of the compression. Shortly before 19' is reached, ignition takes place by means of the sparking plug. After the now following combustion and expansion the valves 6' and 7' open at the point 25 so that the exhaust of the products of combustion and of the added steam from the cylinder 1' and the further expansion in the cylinder 2, which has double the diameter of cylinder 1' or 1'', takes place with a constant communication between the two cylinder-chambers by means of the transfer conduit. About 15° in advance of the point 19 relative to the camshaft the outlet valve 8 of the cylinder 2 opens at the point 27 and directly in front of point 19 at point 21 the suction valve 4' of the cylinder 1', while the transfer valves 6' and 7' do not close until the point 26 is reached. Thus from 21—26 the transfer valves 6' and 7', the exhaust valve 8 and the suction valve 4' are simultaneously opened so that a good discharge and a good charging of the cylinder 1' is insured. The outlet valve 8 closes at point 28 directly before the transfer valve 6'' and 7'' of the cylinder 1'' open.

In Fig. 5 the pressure volume diagram of the first and second stage is shown as it results from the described arrangement of the multi-stage internal combustion engine and of the shown governing periods. In this diagram 0—0' signifies the compression volume of the first stage, 0'—0'' the stroke volume of this stage, 0'''—0'''' the stroke volume of the second stage. Along the line 29—30 the induction of carburetted air to the first stage takes place. In consequence of the admittance of steam, the pressure along the line 30—31 increases and in consequence of the compression the pressure along the line 31—32 increases, the point 32 lying considerably higher, about by 30–40%, than would be the case without the addition of steam. Upon ignition the pressure rises to the point 33 and by expansion the pressure drops to the point 34, which in consequence of the additional introduction of steam and in consequence of the flatter course of the adiabatic steam curve lies considerably higher, about by 60–70%, than it would lie without the addition of steam. Thus there prevails for the expansion in the second stage a higher initial pressure. During the exhaust from the first stage along the line 34—29, expansion occurs in the second stage along the line 35—36 and then along the line 36—37 the exhaust into the atmosphere.

In Fig. 6 a second mode of example is shown where a rotary engine constitutes the second stage in which the exhaust from the first stage takes place at a constant pressure of the height of the final pressure of the working stroke of this stage. 1', 1'', 1''', 1'''' denote the four cylinders of the first stage in which case the sequence of ignition of the various cylinders is as usual: first cylinder, then second cylinder, then fourth cylinder and finally third cylinder, or alternatively first cylinder, then third cylinder, then fourth cylinder and lastly second cylinder. The rotary engine 38 is connected with the crankshaft 3 in such a manner that the rotor 41 is concentrically mounted upon the axis of the crankshaft but excentrically in relation to the casing of the rotary engine.

From the plan shown in Fig. 7 the arrangement of the valves may be seen. 5', 5'', 5''', 5'''' denote the valves for the passing in of the steam, 4', 4'', 4''', 4'''' the suction valves and 6', 6'', 6''', 6'''' the outlet valves of the cylinders of the first stage. During the suction stroke, e. g. of cylinder 1', air is drawn through the carburetor 9, the arrangement thereof may be ascertained from the Figs. 7 and 8. After the suction stroke is finished, thus after the closing of the valve 4', valve 5' opens and an additional charging with steam takes place. This steam is obtained partly from the cooling jacket of the cylinders and is passed by means of the conduit 10 into the recipient 11, partly it is obtained from the evaporator 12 and is by means of conduit 13 passed into the recipient 11. The evaporator 12 is heated by means of the exhaust gases which are passed from the rotary engine 38 through the conduit 14. The steam introduced at the beginning of the compression stroke is then together with the rest of the charge compressed and shortly before the upper dead point of the piston of stage 1' is reached, ignition by means of the sparking plug is effected. When the piston moves downwardly, expansion takes place down to about 6—7 atmospheres. Shortly before the lower dead point is reached valve 6' opens. Within the same period during which from the cylinder 1' a certain quantity of products of combustion and steam is exhausted into the recipient 39, the same quantity of products of combustion and steam is withdrawn by means of the rotary engine 38 from the recipient 39. This quantity of products of combustion and steam flow through the conduit 40 into the chambers, which are formed by the slide-blades movably arranged within the rotor 41 between the latter and the wall of the rotary engine. Thus the pressure within the recipient varies only slightly. The construction of the valveless rotary engine is generally known and not the object of the invention.

The water which in consequence of the vaporisation has to be replaced is forced by means of the pump 16 of any suitable and known construction through the conduit 17 into the evaporator 12, and through the conduit 18 into the cooling jacket of the cylinders.

In Fig. 9 the opening periods for the valves of the cylinder 1' for one revolution of the camshaft equal to two revolutions of the crankshaft are indicated. In this diagram the upper dead points of the piston of the cylinder 1' correspond with the points 19 and 19' and the lower dead points of this piston with the points 20 and 20'. Shortly past the point 19 the suction valve 4' opens at the point 21 and closes shortly after the lower dead point 20 at the point 21. Directly thereafter the steam inlet valve 5' opens at point 23 and closes at point 24. Up to the upper dead point 19' the charge of combustible and air and the additionally passed in steam is compressed and shortly before the point 19' is reached, ignition by means of the sparking plug takes place. After the then following combustion and expansion the valve 6' opens at point 25 and the exhaust from the cylinder 1' into the recipient 39 commences at approximately constant pressure, compressed gas being constantly withdrawn from the recipient 39 through conduit 40 by the rotary engine so that the pressure prevailing in the recipient 39 remains approximately constant.

Fig. 10 represents the pressure volume diagram for a cylinder of the first stage and the diagram of the second stage for the quantity of gas originating from this stroke. In this case the pressure volume surface 35—35'—36—37 is considered to be the sum of the various surfaces which would result in case of the expansion of the gas which is enclosed within the various chambers formed by the slide blades of the rotary engine. In Fig. 10 0—0' denotes the compression volume and 0'—0'' the stroke volume of the cylinder 1', and 0'''—0'''' the volume up to which after half a revolution of the rotary engine gas taken from the recipient 39 is expanded.

Along the lines 29—30—31—32—33—34 the pressure varies as described with reference to Fig. 5. Along the line 34—34' then exhaust into the recipient 39 takes place. When the rotary engine 38 makes at the same time half a revolution, the volume of gas 35—35' is withdrawn from the recipient 39 and is expanded up to the volume 35—36, in order to be exhausted during the next half revolution along the line 36—37 and through the conduit 14.

In Figs. 11, 12 and 13 a third mode of example is shown which differs from the preceding only thereby that the charge of the cylinder of the first stage is preliminarily compressed in a compressor and that the additionally introduced steam is added to the preliminarily compressed mixture of fuel and air. In Fig. 11 the four cylinders of the first stage are again denoted by 1', 1'', 1''' and 1''''. The rotary engine 38 constituting the second stage and engine 42 acting as compressor are connected to the crankshaft 3'. The rotor 41 of the rotary engine 38 as well as the rotor 43 of the rotary engine 42 are coaxial with the crankshaft 3. From the plan in Fig. 12 the arrangement of the valves may be seen. The suction valves are denoted by 4'; 4'', 4''' and 4'''' and the exhaust valves of the cylinders of the first stage by 6', 6'', 6''' and 6''''. The valve for the steam-inlet is denoted by 5. During the suction stroke f. i. of the cylinder 1' the additionally admixed steam is filled into the preliminarily compressed charge when valve 4' is opened. This steam is partly obtained in the cooling jacket of the cylinder and partly obtained from the evaporator 12, being passed to the valve 5 by means respectively of conduit 10 and a conduit 13. The evaporator 12 is heated by means of the exhaust gases which are passed through it by means of the conduit 14. The additionally admitted steam is compressed in the cylinder together with the rest of the charge and shortly before the upper dead point of the piston ignition by means of the sparking plug takes place. Upon the downward stroke of the piston expansion down to about 6-7 atmospheres now takes place. Shortly before the lower dead point is reached, valve 6' opens. As the contents of the cylinder 1' are gradually exhausted into the recipient 39, a corresponding part of the contents of the recipient 39 is successively through conduit 40 filled into the rotary engine 38 and is here expanded down to atmospheric pressure. By means of the rotary engine 42 acting as a compressor air is drawn in through the carburetor 9, compressed and passed through the conduit 44 into the recipient 45, into which by means of the spring actuated valve the steam obtained is passed. The water which has to be replaced in consequence of the vaporisation is forced by means of the pump 16 through the conduit 17 into the evaporator 12 and through the conduit 18 into the cooling jacket of the cylinders.

In Fig. 14 the opening periods of the valves are indicated for the cylinders 1' for one revolution of the camshaft corresponding to two revolutions of the crankshaft. In this diagram the upper dead points of the piston of the cylinder 1' correspond to the points 19 and 19' and the lower dead points of this piston to the point 20 and 20'. Shortly behind the point 19 the suction valve 4' opens at point 21 and closes shortly after the lower dead point 20 at point 22. Since one of the four suction valves is constantly open as soon as sufficient pressure steam prevails, the steam valve 5 is also constantly open. Up to the upper dead point 19' the steam and the charge of combustible and air are compressed and shortly before point 19' is reached ignition takes place by means of the sparking plug. After the following combustion and expansion valve 6' opens at point 25 and the exhaust from the cylinder 1' into the recipient 39 takes place at a constant pressure.

Fig. 15 is the pressure volume diagram for the cylinder of the first stage and for half the revolution of the second stage belonging thereto. The pressure volume surface 35—35'—36—37 has to be understood to constitute the sum of the various pressure volume surfaces of half a revolution, in which every single pressure volume surface will appear in consequence of the expansion of the gas, which is enclosed in the space formed by two slide blades. In the Fig. 15 0—0' denotes the compression volume and 0'—0'' the stroke volume of the cylinder of the first stage and 0'''—0'''' the volume to which at half a revolution the volume of gas taken from the recipient is expanded. Along the line 29—31 the filling into the first cylinder of the first stage takes place. In the course of compression the pressure along the line 31—32 increases. From the combustion the point 33 is obtained and from the now following expansion the point 34 which in consequence of the admitted steam and in consequence of the flatter course of the abiabatic curve of the steam lies from 60—70% higher than the final pressure would be without the additional filling in of steam. Along the line 34—34' the exhaust into the recipient 39 then takes place. During half the revolution of the rotary engine taking place at the same time a volume of gas 35—35' is withdrawn from the recipient 39 and expanded to the volume 35—36 and upon a further rotation is exhausted into the conduit 40 so that point 37 of the diagram is reached.

I claim as my invention:

1. In an internal combustion engine having at least two stages of expansion, engine cooling means, a vaporizable liquid in said cooling means, exhaust means for the second stage, said engine cooling means and said exhaust means being adapted to convert said liquid into vapor, means for introducing the thus produced vapor into the first stage during the fuel charge compression period taking place in that stage, means for conveying from the first stage into the second stage the products of combustion and the introduced vapor, during the primary expansion period taking place in the first stage, for the final or secondary expansion in the second stage, and means for releasing from the second stage the finally expanded gases into said exhaust means, while the primary expansion period is taking place in the first stage.

2. In an internal combustion engine having at least two stages of expansion, a combustion-first stage expansion unit and second stage expansion means operatively connected therewith, cooling means for said unit adapted to accommodate and evaporate a vaporizable cooling liquid; exhaust conveying means leading from said second stage expansion means and being provided with an instrumentality for effecting additional evaporation of said liquid; said unit having controlled fuel intake, vapor intake and exhaust ports; said second stage expansion means having controlled inlet and exhaust passages; the exhaust port of the unit being connected with the inlet passage of the second stage expansion means; the exhaust passage of the latter connecting with said exhaust conveying means; means for timing the controls for said ports and said passages so that vaporized liquid is introduced into said unit at the beginning of each fuel charge compression period, and that a transfer of combustion products and vapor from said unit into said second stage expansion means commences shortly before the end of the first expansion period.

3. In an internal combustion engine, as set forth in claim 2, means, forming an operatively connected part of said engine, for compressing combustible air and fuel charges, prior to their introduction into said unit, through its fuel intake port.

4. In an internal combustion engine composed of at least two stages of expansion, the first stage comprising a suction, compression, combustion and primary expansion unit, the second stage comprising a secondary expansion device, operatively connected with said unit; a cooling system provided for the engine; a vaporizable liquid in said cooling system, the latter being adapted to evaporate the liquid therein; said secondary expansion device having an exhaust conveyer provided with means for effecting additional vaporization of the liquid; a compressor, forming an operative part of the engine and being adapted to preliminarily compress combustible charges of air and fuel prior to their introduction into the unit; said unit having controlled fuel intake, vapor intake and combustion products discharge ports; said second expansion device having controlled inlet and exhaust passages, the latter connecting with said exhaust conveyer; the combustion products discharge port of the unit being connected with the inlet passage of the second expansion device; means for actuating and timing the controls for said ports and passages so that vapor is introduced into the unit at the commencement of the fuel charge compression period, and that the exhaust products from the unit are passed into said device for secondary expansion, prior to the ending of the first stage expansion period.

5. In an internal combustion engine, as set forth in claim 4, said unit comprising a four-cycle type cylinder, piston, piston rod and crank shaft ensemble of a certain displacement, said secondary expansion device comprising a cylinder, piston and piston rod ensemble of a far larger displacement, and being connected with the first ensemble by means of said crankshaft.

6. In an internal combustion engine, as set forth in claim 4, said unit comprising a four-cycle engine, said secondary expansion device comprising a rotary engine, operatively associated with the crankshaft of said unit.

7. In an internal combustion engine, as set forth in claim 4, said unit comprising a four-cycle engine, said secondary expansion device comprising a rotary engine, operatively associated with the crankshaft of said unit, and said compressor being a rotary compressor also operatively associated with that crankshaft.

CHRISTIAN WILHELM PAUL HEYLANDT.